Sept. 16, 1969  L. ZANUSSI  3,467,489

METHOD OF WASHING

Filed Oct. 23, 1964  2 Sheets-Sheet 1

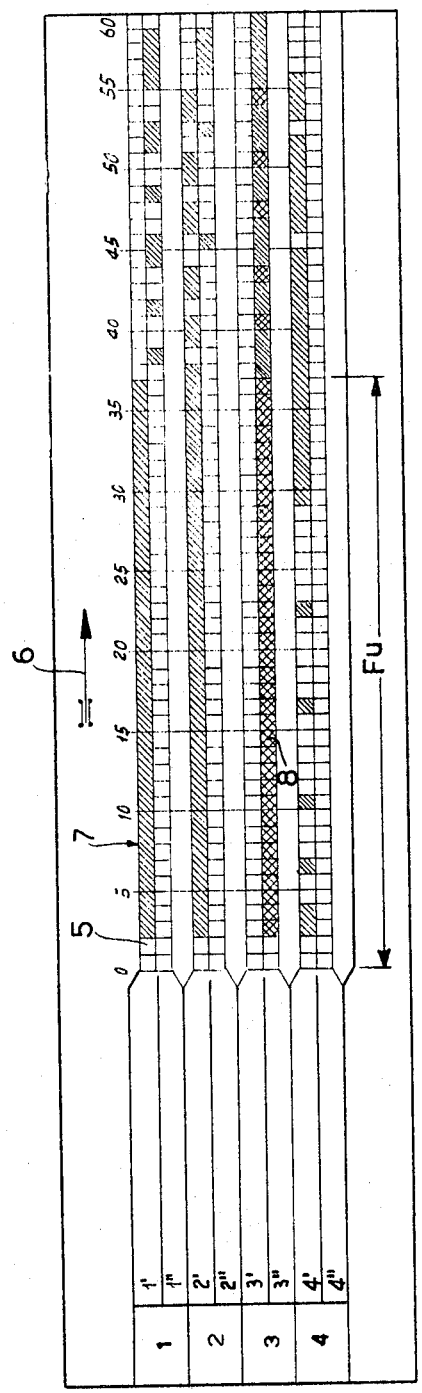

United States Patent Office 3,467,489
Patented Sept. 16, 1969

3,467,489
METHOD OF WASHING
Lino Zanussi, Ronche di Fontanafredda, Italy, assignor to Industrie A. Zanussi, Pordenone, Udine, Italy, a firm
Filed Oct. 23, 1964, Ser. No. 406,017
Claims priority, application Italy, Oct. 29, 1963, 22,203/63
Int. Cl. D06f *35/00;* B08b *3/08*
U.S. Cl. 8—137                                                     2 Claims

ABSTRACT OF THE DISCLOSURE

An automatic washing machine in which a single unified washing stage is effected in which water and detergent are introduced in a single operation at the beginning of the stage, the temperature of the water during said stage gradually increasing while the linen to be washed is mechanically agitated and alternately stopped in such a manner that the duration of the periods of agitation decrease during the execution of the stage as compared to the duration of the periods of stoppage. Finally, the soiled water and detergent are discharged at the end of the stage.

---

The automatic washing machines presently in use may be subdivided into two categories, to wit the superautomatic machines and the actual automatic machines.

The superautomatic machines are those wherein, after the first preliminary operations are executed by the operator and consists in introducing the articles to manually controlled operations. The group of superautomatic washing machines includes those operating according to a program which is defined by a timing system selected by the operator. The same group also includes the so-called keyboard machines, wherein the program is selected through one or more push-buttons, so-called card-controlled washing machines where the program is executed by means of perforated cards or cam-shaped cards which are made of plastic material.

Automatic washing machines are those which, after the preliminary operations executed by the operator and consisting in the introduction of the articles of linen into the machine and of the detergent into the corresponding containers, stop after the first stage of the washing cycle or preliminary washing stage and require once only throughout the washing cycle, the intervention of the operator who has to introduce a second time a further amount of detergent intended for the actual washing and who is to start the second stage or actual washing stage which is then followed automatically by the rinsing and drying stages which are executed automatically so as to deliver a clean and dry linen.

In the conventional washing machines of such an automatic type, the following operations are executed: as a preliminary step, introduction of the linen, introduction of the detergent, these two steps being executed by hand by the attendant.

After said preliminary operations, the following automatic operations are executed, except for a few possible After said preliminary operations, the following automatic operations are executed, except for a few possible unessential modifications:

(1) Introduction of the water as adjusted by a level regulating system which controls a valve actuated by a solenoid, (2) Preliminary washing operation which is almost always executed with cold water and the detergent and which is adjusted as to duration by the timing system which is energized by the level regulator, (3) Discharge as adjusted by the timing system which starts operation of a pump or opens the passage towards discharge, (4) Stopping of all the mechanical movements, (5) Introduction of the second dose of detergent, either by hand in automatic machines or automatically in superautomatic machines, (6) Introduction of water as adjusted by the level regulator controlling the valve actuated by a solenoid, (7) Heating started by the level regulator which in addition to a stopping of the inflow of water, energizes the heating circuit, (8) Distribution of the detergent which is obtained predominantly during the heating stage by means of suitable movements given to the basket, (9) Stopping of the heating stage under the action of a thermostat,

(10) Restarting of the cleaning arrangement under the action of the thermostat, which latter, in certain cases, not only stops the heating, but energizes also the timing system,

(11) The actual washing during which the soiling material is removed. In machines provided with a rotary basket, said removal is obtained through a rotary movement which is unidirectional or reciprocatory. In the case of reciprocatory rotation, the timing system controlling the duration of operation is energized in series with a reversing switch ensuring alternatingly clockwise and counter-clockwise rotation,

(12) Draining. The timing system starts the pump or the exhaust means through which the water is expelled,

(13) Introduction of water for rinsing,

(14) Rinsing, as provided by the movements given to the basket,

(15) Centrifugation through a high speed rotation of the basket,

(16) Exhaust of the rinsing water which is obtained before or simultaneously with the centrifugation,

(17) Final centrifugation until complete drying of the linen under the control of the timing means defining the duration of said centrifugation,

(18) Exhaust of the remaining rinsing water which is obtained before or simultaneously with the final centrifugation,

(19) Stopping through a complete deenergization of all the parts and of the actual timing system.

It should be noted that in all the cases referred to, it is necessary to execute: two detergent-introducing steps; an intermediate draining of the water and detergent after the preliminary washing stage; special action of the thermostat, which not only adjusts the temperature of the water, but controls the starting of the delaying system by starting the next stage.

The present invention has for its object to provide a superautomatic washing machine operating in accordance with an improved cycle, in which, the two conventional preliminary washing and actual washing stages are associated so as to form a single stage termed a "unified washing stage" during which:

(a) The introduction of the water and of the detergent is performed only once, starting from the beginning of the unified stage, (b) The water is exhausted only once at the end of said unified stage, (c) The temperature of the water carrying the detergent is caused to increase gradually from the beginning of said unified stage up to the end of the stage so as to reach finally a predetermined value depending on the nature of the fabric forming the linen, (d) The different operations consisting in a mechanical action due to the movements of the basket and in a chemical action during the stops of the basket, are executed during the periods of said stage the duration of which substantially decreases for the first operation and increases for the latter operation.

Careful observation and experimentation have allowed improvements in said washing cycle and in its stages or operations, which form the main novelties of the present invention.

The invention is characterized by the incorporation of the preliminary washing with the actual washing stage, that is without any intermediate removal of the water or of the water carrying the detergent, while eliminating the thermostat and its action on the starting of different stages, so that the temperature of the water carrying the detergent increases gradually from the beginning to the end of the progression of the stage and consequently of the corresponding mechanically acting movements and chemically acting stoppages, instead of starting the operations after an idle period and stopping them when a predetermined temperature is reached; furthermore it is no longer necessary to introduce the detergent more than once during the complete washing cycle, which cuts out in all automatic machines, the necessity of any interference by the attendant. In the afore described way superautomatic operation is obtained also in this latter type of machine. The unified stage referred to may be modified as to the duration, repetition, rhythm and the like of the different operations, with a view to obtaining the desired results as will be disclosed hereinafter and it is possible in particular to modify the amounts of detergent incorporated, by replacing the double introduction with a single introduction, which does not correspond to the sum of the two quantities formerly required, but is smaller, because it has been proved that at the end of the preliminary washing the detergent still maintains a considerable deterging power which was enhanced by the successive rise of temperature, even if the preliminary washing had been carried out with warm lye instead of cold; while on the other hand, diminishing of the quantity of detergent in this preliminary washing stage would diminsh or impair the effect necessary from the same stage.

Consequently a structural simplification is obtained by the elimination of the control of the cycle by the thermostat while the timing system is considerably simplified by the elimination of a number of cams. This results in a more durable structure requiring a lesser technical attendance.

An economy in the consumption of water and detergent is also obtained while the washing effect is better than that obtained with the above-described conventional cycles, said washing effect being ascribable to the gradual increase in temperature during the unified stage including the preliminary washing and actual washing stages, which allow removing the soiling material of any kind at the desired temperature for dissolving or removing said soiling material without this being detrimental to the final result, since the soiling material when removed or dissolved, is incorporated intimately with the detergent and can never, even in a diffused manner, return into the fabric.

It should also be considered that an optimum final result is ensured by the rinsing and drying stages.

The conventional thermostatic control of the temperature of the water is advantageously replaced by an accurate selection of the heating power with reference to the duration of the unified stage, to the amount of water to be considered etc. This selection ensures the obtention of final temperatures approximating the temperature tolerated by the different fabrics and additionally said temperature may be adjusted to different values and even the unified stage may begin at an intermediate moment whereby its duration may be modified correspondingly.

Said temperature may, if required, approximate 100° C. beyond which temperatures it is obviously impossible to operate.

Beyond choosing the proportionate power, if desired, the thermal protection of the machine casing can be increased by means of shields or thermal insulation for eliminating the influence of variations of the room temperature on the hot water used in the washing stage.

The unified stage differs substantially from the two stages forming it, as concerns the elimination of the operations numbered (3), (4), (5), (6) (7), (8), (9), (10) and also by reasons of the different delay, duration, repetition, rhythm etc, of each operation and it cannot be replaced by conventional stages provided in the usual washing cycles and it cannot either be replaced by resorting to the last rinsing stage or preliminary stage and it is not possible to merely cut out the preliminary washing stage in as much as it would not be possible thus to reach the results of the special unified stage forming the object of the present invention, which leads to a completely novel washing cycle. In fact, the removal of the dirt from the linen is the result of a mechanical action and of a chemical action, both governed by the temperature of operation.

It should be remarked that certain kinds of soiling materials are removed easily through a mechanical action and a moderate chemical action at a low temperature. Other kinds of soiling material conversely, require a strong chemical action, intensified by a higher temperature while the mechanical action may be reduced with a view to protecting the garments against damage.

The preliminary adjustment of said operations defines the unified stage. In such a unified stage, there is provided substantially a more protracted mechanical action at a low temperature which decreases with the increase in temperature, while leaving thus a longer time for a chemical action on the linen when the latter is stationary.

With said proportioning between the two actions, it is possible to obtain a perfect washing without any wear of the fabrics, in fact at low temperatures the fabrics resist better and, in contradistinction at raised temperatures if subjected to an energetic chemical action, the fabric may be damaged uselessly by the continuation of the mechanical action. Said mechanical action should be limited accurately, which is generally not the case with the conventional preliminary washing stage; when washing with conventional media, the linen is exaggeratedly worn and is subjected to an insufficient washing, the reason lying in the fact that the mechanical and chemical actions are not suitably adjusted with reference to the gradual increase in temperatures.

The features of the invention will appear clearly upon reading of the following description referring to a preferred embodiment illustrated by way of example in the accompanying drawings wherein:

FIG. 2 is a washing chart showing the complete operation of the washing machine.

Figure 1:
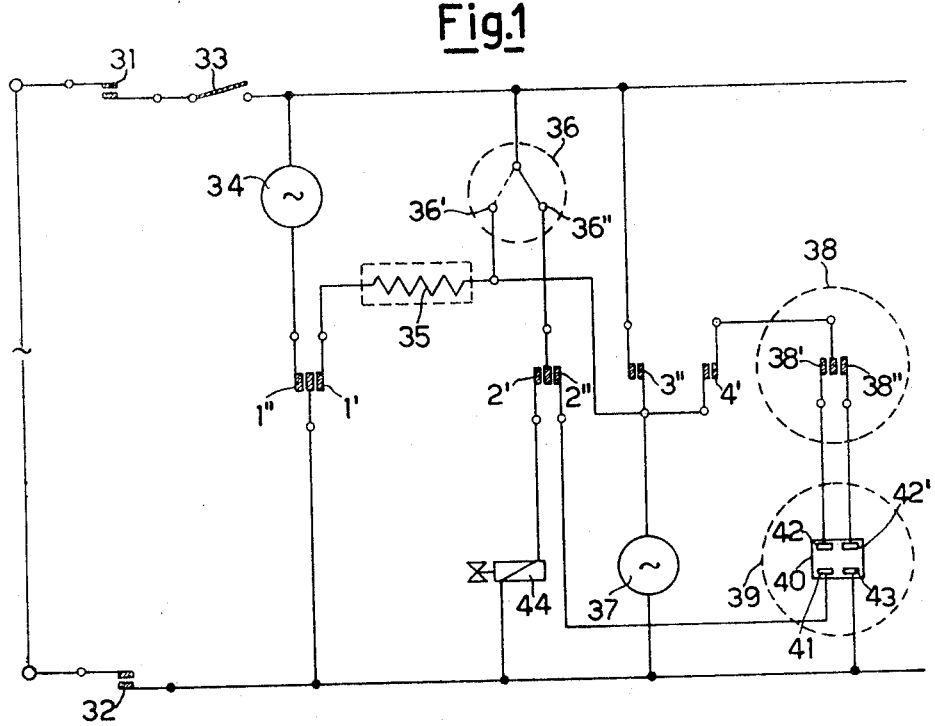
FIG. 1 is a wiring diagram which allows the execution of the novel cycle.

FIG. 1 illustrates one of the possible electric circuits allowing the execution of the complete cycle according to the chart illustrated in FIG. 2. In said FIG. 1 are illustrated the contact pieces of the timing system; 1'—controlling the heating, 1''—the exhaust, 2'—the introduction of cold water, 2''—the rotation at high speed, 3''—the motor driving the timing means, 4'—the rotation at low speed. Furthermore, the contact-pieces of the main switch are illustrated at 31 and 32. The safety switch is carried on the door of the washing machine at 33. The exhaust pump is shown at 34, the heating element at 35, the level regulator at 36 with the contact-pieces 36' corresponding to a full container and the contact-pieces 36'' corresponding to an empty container at 36''. The motor driving the timing system is shown at 37, the movement-reversing switch at 38 with the reversing contact-pieces 38' and 38'', the motor of the washing machine at 39 with its terminal box including the terminal 41 for the high speed connection and the terminals 42 and 42′ for low speed connection, the latter providing clockwise and counter-clockwise rotation respectively, whereas the terminal 43 forms the common return terminal. Lastly the solenoid-controlled valve 44 is controlled by the level regulator.

FIG. 2 is a chart of a preferred embodiment of the washing cycle of which the primary section is constituted by the unified stage.

Said FIG. 2 shows the operations and the stages to be executed by the timing system with its four cams adapted to control the execution of the complete washing cycle including the unified stage. The invention covers the stages obtained as follows: the four cams 1, 2, 3, 4 of the timing means each control two contact-pieces, to wit respectively 1′–1″, 2′–2″, 3′–3″ and 4′–4″. For each each contact-piece there is shown in the chart a horizontal series of small square spaces 5 numbered in sequence in groups of 5 and corresponding in the direction of the arrow 6 to the succession of elementary periods of say, two minutes each.

The empty square spaces of any series show that the corresponding contact-piece is open, and no current passes through it while the completely full square spaces such as 7 show that the corresponding contact pieces the closed and allow passage of the current through a direct actuation of the contact-pieces of the timing system; lastly when a square space is cross-hatched, as shown at 8, this means that the contact-piece is closed without any current passing through the contact-piece of the timing system, while current passes through another member such as for instance the level regulator.

Consequently the washing machine and also the timing system are connected or disconnected with reference to the mains through main general switch 31–32 which is associated with safety switch 33.

The contact-pieces for the different control operations have the following parts to play:

1′—heating, 1″—exhaust, 2′—feeding of cold water under the control of the corresponding valve actuated by its solenoid, 2″—rotation of the basket or the like washing member at a high speed for centrifugation, 3′—available, 3″—motor of the timing system, 4′—low speed for the unified stage (corresponding to conventional preliminary washing and washing stages) and the following stages, that is the rinsing and drying stages, 4″—available.

It should be remembered that the feeding of water is adjusted by a level regulator controlling the valve 44 actuated by a solenoid independently of the timing system and furthermore during the low speed stages, there is inserted in series with the timing system a speed reversing system gear 38 which ensures the reversal of movement and adjusts for instance periods of 24 seconds of clockwise movement, six seconds of stoppage, 24 seconds of counter-clockwise movement, again six seconds of stoppage and so on.

The cycle is as follows: the washing machine and all the apparatatus and arrangements are at rest, the timing system being in its zero position. The attendant, after introducing the linen to be washed and the detergent, acts manually through the agency of a knob, or the like, suitable means controlling the timing system so as to make the different cams progress up to the third square space, that is up the elementary time 3 at which the introduction of cold water begins under the action of the contact-piece 2′ and consequently the level regulator, until it reaches the desired position, cuts out the following contact-pieces: 1′ for the heating, 3″ for the motor controlling the timing system and 4′ for low speed rotation, which contact-pieces are immediatetly operative once the desired water level has ben reached.

The cams driven by the motor of the timing system rotate and progress in accordance with the predetermined durations of the different periods.

The examination of the progression of the cycle shows the following features of the invention.

It should be first remarked that the contact-piece 3″ for the motor driving the timing system remains continuously inserted in the circuit drawn in solid lines; in other words, it rotates from the beginning of the washing cycle up to its end, that is up to the elementary period 60 and during this time, it is fed by current either through the closed contact-piece of the level regulator during the periods shown in cross-hatched lines 8 or else directly from the contact-piece 3″ during the periods shown in solid hatched lines.

With respect to the above, it should also be mentioned that the cycle is a continuous operation without any interruption requiring an intervention of the attendant, that is in a completely automatic manner, which usually should be classified with the superautomatic cycles. The washing cycle begins thus with a unified stage (preliminary washing plus washing) and consequently is continued without any intermediate discharge either of the water or of the detergent during the actual stage which results in producing a single discharge of the water during all the washing stage only at the end of the unified stage, which forms thus one of the features of the invention.

It is apparent that the contact-piece 1′ provided for heating remains inserted in the circuit from the start at the elementary period 3 up to the end of the part played by it corresponding to the elementary period 37, that is before the single discharge of the water which is obtained through the agency of the contact-piece 1″ during the elementary period 38.

This shows a further feature of the invention which consists in that the washing machine is not provided with an adjusting and regulating thermostat controlling the temperature of the water, which is required in the conventional arrangements for the starting of the motor of the timing means when a predetermined temperature has been reached. In the present case, in contradistinction, the temperature increases gradually up to the elementary period 37 which latter may be variously adjusted with a view to obtaining the desired final temperature. Obviously said further feature forms an implicit confirmation of the preceding feature according to which the first preliminary washing stage is incorporated with the unified stage including also the actual wshing stage. Consequently the washing cycle continues up to its end without any interruption and furthermore the beginning of said cycle is performed while the water has not been subjected to any substantial increase in temperature.

This phenomenon is associated with the action of the contact-piece 4′ for low speed operation and, in fact, it is closed during the elementary periods 3 and 4 and the periods 11–17–23 so as to define with the elementary periods 29 to 38 the various operations constituting the unified stage, which groups the preliminary washing and the actual washing stages, and where at the elementary period 38 the water and the detergent have reached the desired maximum temperature.

It is only at such a moment that the hot water and detergent are exhausted for the first and only time and in a final manner, under the action of the exhaust contact 1″ which operates during said elementary period 38.

The low speed contact 4′ remains operative up to the end of the washing cycle in alternation with the rotation at a high speed which latter is obtained under the action of the contact 2″ during the elementary period 46 and 53 during which the rinsing water is exhausted and during the periods 56, 57, 58 during which the centrifugation and final drying are performed.

Between the above mentioned elementary periods corresponding to high speeds, it is possible to introduce as a modification, cold rinsing water under the action of the contact 2′ respectively at the elementary periods 39, 40, 43, 44, 46, 47, 49, 51 and 54, 55. The introduction of the water remains adjusted as to its level by the level regulator.

Figure 3:
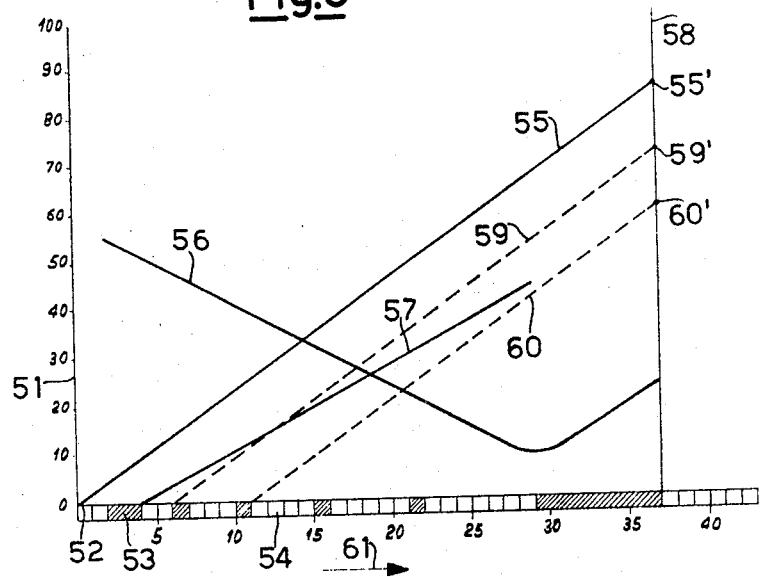
FIG. 3 is a chart relating to the modifications in temperature and to the elementary moving and stopping operations during the unified washing stage.

As concerns the chief features of the unified stage referred to precedingly in the present specification, FIG. 3 shows, always by way of a mere example without any limitation being implied thereby, the progression of the unified stage considered alone. This illustration is provided by a graph which shows clearly in a comparative manner the modifications in temperature corresponding to the various ratios of duration of the mechanical action on the linen during its movement and of the chemical action on the linen when at a standstill.

In said FIG. 3 are shown the ordinates 51 along which are recorded increasing values expressing the progression in values of temperature, of mechanical action and of chemical action. The abscissae 52 show on the other hand increasing values of time in the direction of the arrow 61, that is the duration of the different elementary operations and of the actual unified stage including said operations.

Furthermore the succession of square spaces illustrating the elementary periods extending for instance over two minutes each, are numbered in groups of five so as to allow an easy indication of the period corresponding to mechanical action by the full square space 53 while the periods corresponding to chemical action are shown by the empty square spaces 54. In FIG. 3 line 55 shows the progression of the temperature and the line 56 that of the mechanical action while the line 57 shows the progression of the chemical action on the linen when at a standstill and finally the vertical line 58 shows the end of the unified stage. The lines 59 and 60 drawn in interrupted lines show the progression of the temperature when the heating and the phase begin for instance at the elementary periods 5 and 11 so as to reach consequently the final temperatures 59° and 60°, this being in direct relationship with the various types of fabrics which may be subjected to washing.

The above-mentioned FIGURE 3 shows obviously that the mechanical action in the full square spaces 53 is more marked at low temperatures and decreases gradually while the chemical action corresponding to the empty square spaces 54 increases with the time elapsed and with the rise in temperature.

Of course, towards the end of the unified stage, the mechanical action extends over a longer time during the elementary periods 30 to 37, which is a phenomenon common to all the cycles and to all the fabrics and forms the minimum required mechanical action.

It is also obvious that if the heating and the unified stage have begun at periods different from zero, the actual stage will correspondingly be shortened so that a final lower temperature is reached, which actually excludes the first mechanical operations which are the more energetic and last longer. This corresponds exactly to the requirements when washing delicate fabrics which should be subjected to lower temperatures and to a lesser mechanical action but to a correspondingly increased chemical action when at a standstill, it being important to remember that said chemical action is adjusted by the amount and grade of the detergent.

In the description given of the unified stage hereinabove, the different advantages and features of the novel cycle of washing, are substantially disclosed.

In the preceding description referring to FIGS. 1, 2 and 3, the durations considered and the means resorted to are given out by way of a mere exemplification and may be modified without widening the scope of the invention, as defined in the acompanying claims, provided the characteristic conditions of the invention are satisfied, to wit the incorporation of the preliminary stage with the actual washing stage to form the single unified stage, which latter forms the beginning of the washing cycle, the elimination of the thermostat for adjusting the heating of the water and/or the consequent elimination of the control of the beginning of the different stages as produced and governed by the actual washing cycle, without any interference of the attendant, with a single introduction of detergent, with a single exhaust of the water and of the detergent and with a progression of the different operations during the unified stage, and of the cycle substantially as described and illustrated, with the possibility of adjusting the starting moment and the duration of the unified stage.

What is claimed is:

1. In a method for washing linens in an automatic washing machine having loading, washing, rinsing and centrifugation stages, the improvement wherein a single unified washing stage is provided comprising introducing water and detergent in a single operation at the beginning of said stage, gradually increasing the temperature of the water during said stage, mechanically agitating the linen with regular alternating periods of stoppage between successive agitations, the duration of the periods of agitation successively decreasing during the execution of the stage with reference to the duration of the periods of stoppage, and discharging the soiled water and detergent at the end of the stage.

2. A method as claimed in claim 1, wherein the increase in temperature of the water is initiated at an intermediate time in the stage.

References Cited
UNITED STATES PATENTS

| | | |
|---|---|---|
| 2,914,935 | 12/1959 | Sampsel. |
| 2,975,624 | 3/1961 | Geschka. |
| 3,170,314 | 2/1965 | Worst. |

MAYER WEINBLATT, Primary Examiner

U.S. Cl. X.R.

68—16; 8—158, 159